United States Patent [19]
Hileman et al.

[11] Patent Number: 5,202,949
[45] Date of Patent: Apr. 13, 1993

[54] DUST COVER FOR FIBER OPTIC FERRULES OF OPTICAL FIBER CONNECTORS

[75] Inventors: Ronald A. Hileman, Camp Hill; Wallace R. Savitsky, Harrisburg, both of Pa.

[73] Assignee: AMP Incorporated, Harrisburg, Pa.

[21] Appl. No.: 876,674

[22] Filed: Apr. 30, 1992

[51] Int. Cl.⁵ .......................... G02B 6/00; G02B 6/26
[52] U.S. Cl. ................................................. 385/134
[58] Field of Search ........................... 385/134–137

[56] References Cited

U.S. PATENT DOCUMENTS 4,640,575 2/1987 Dumas ............................... 385/134
4,979,792 12/1990 Weber et al. ....................... 385/134

Primary Examiner—Akm E. Ullah
Attorney, Agent, or Firm—Katherine A. Nelson; Driscoll A. Nina, Jr.

[57] ABSTRACT

A dust cover for covering one or more fiber optic ferrules of an optical fiber connector. The dust cover comprises a base portion and at least one protruding portion extending therefrom, each of the at least one protruding portion having a cavity therein for receiving one of the one or more ferrules to cover the one or more ferrules when the dust cover is mounted to the connector. The dust cover is particularly designed for connectors having a plurality of ferrules for terminating a plurality of optical fibers, and is especially advantageous for connectors having a retractable body portion which normally surrounds the ferrules when the connector is not in use; and permits all of the plurality of ferrules of a connector to be individually covered substantially simultaneously in a single operation. The dust cover also includes a grasping portion to facilitate grasping and manipulation of the cover, and a lanyard to connect the dust cover to an optical fiber cable to which the connector is attached to prevent misplacement of the cover when it is not in use.

17 Claims, 6 Drawing Sheets

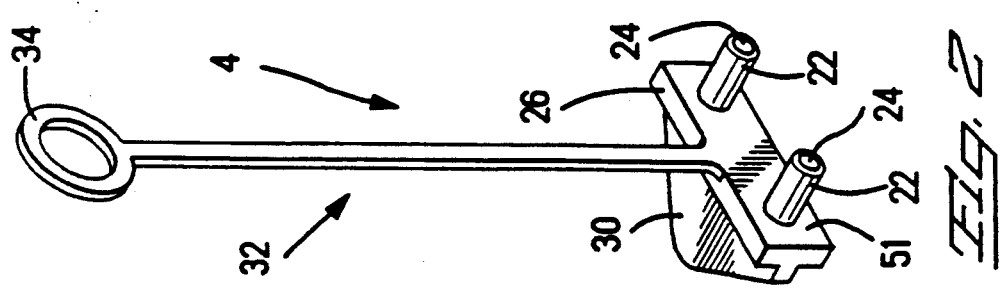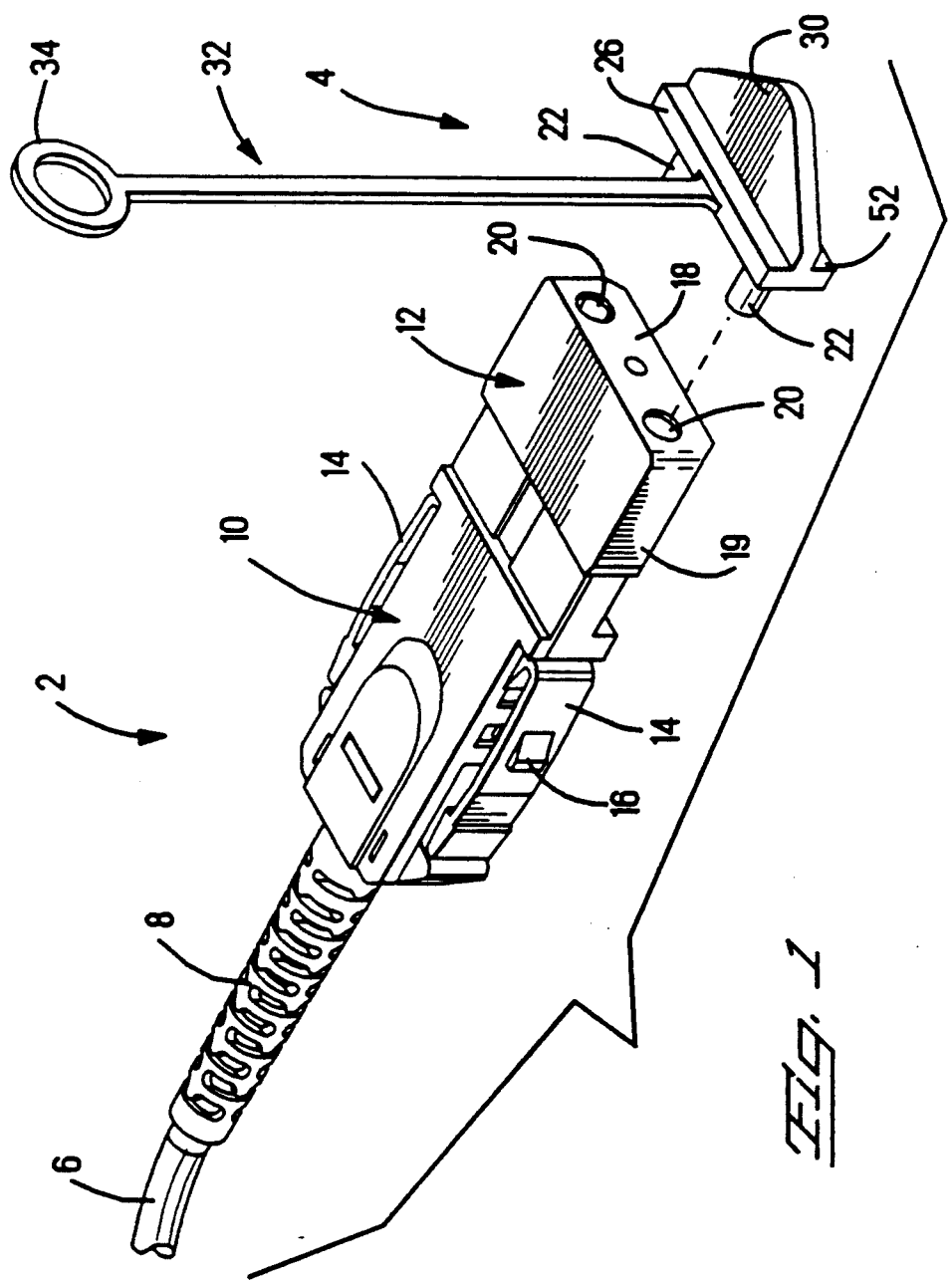

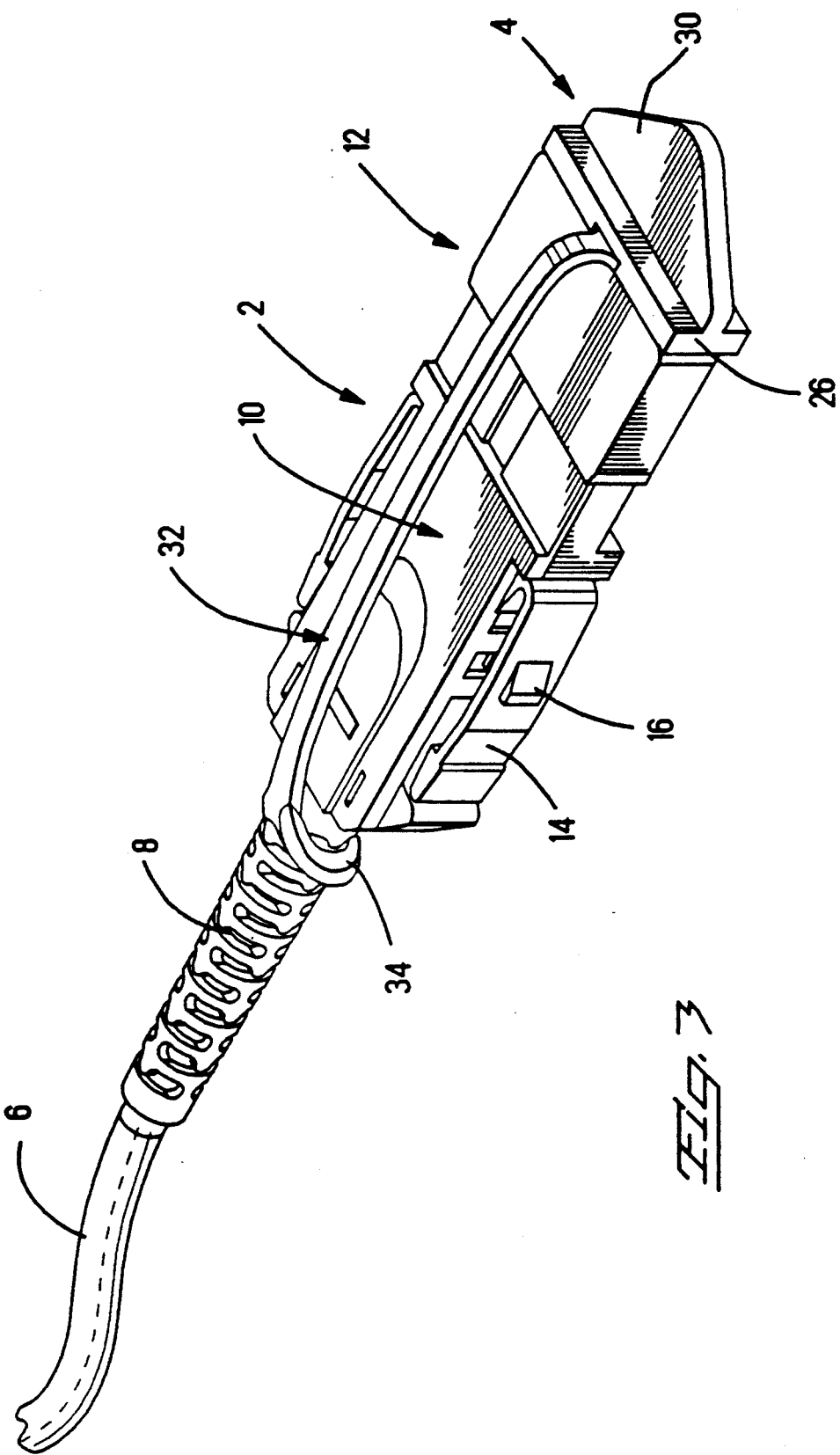

DUST COVER FOR FIBER OPTIC FERRULES OF OPTICAL FIBER CONNECTORS

FIELD OF THE INVENTION

The present invention relates generally to a dust cover for optical fiber connectors; and, more particularly, to a dust cover for covering fiber optic ferrules of optical fiber connectors.

BACKGROUND OF THE INVENTION

Optical fiber connectors are used to facilitate mating of optical fibers to one another in an end-to-end relationship so as to permit optical energy carried by the fibers to be transmitted therebetween. Frequently, such connectors include one or more fiber optic ferrules of ceramic or other suitable material for terminating exposed ends of the optical fibers in order to protect the delicate fibers and to assist in aligning the fibers during mating.

When an optical fiber connector is not in use (e.g., is not connected to another connector), it is often desirable that it be covered so as to prevent dust and other debris from collecting on the ends of the ferrules or on the exposed end surface of the optical fibers carried thereby as such contaminants can interfere with proper mating of fibers and affect the proper transmission of optical energy between connected fibers. Accordingly, it is known to provide a dust cover for such connectors to be used during transport or storage or at other times when the connectors are not in use.

One known type of dust cover is described in U.S. Pat. No. 4,979,792 and comprises a member which substantially encircles and covers the mating end of a connector. Although such a cover is useful in preventing dust or other debris from entering into the body of the connector, it does not separately cover the individual ferrules themselves; and any dust that may have entered into the body of the connector prior to mounting of the cover may still settle on the ferrules.

Another known type of dust cover comprises a flexible, tubular-shaped member which is adapted to be inserted onto and over an individual fiber optic ferrule. Such dust covers are effective in protecting the ferrules and the optical fibers carried thereby from dust and other debris, but also tend to be rather difficult to handle and manipulate. For example, many connectors carry a plurality of separate ferrules for terminating a plurality of optical fibers, and it is necessary to insert a cover onto or remove a cover from each of the plurality of ferrules one at a time. This procedure is not only time-consuming, but can also be quite difficult in many connector designs.

Furthermore, many connectors include a retractable body portion which normally surrounds the ferrules when the connector is not in use; and in such connectors, it is often necessary to hold the retractable body portion in its retracted position with one hand to expose the ferrules, and to insert the individual dust covers onto the ferrules one at a time with the other hand. This procedure is often particularly difficult and awkward to accomplish with any degree of efficiency.

SUMMARY OF THE INVENTION

The present invention provides a dust cover for optical fiber connectors which facilitates the covering (or uncovering) of one or more fiber optic ferrules which may be carried in the connector. The dust cover according to the present invention comprises a base portion, and at least one protruding portion extending from the base portion, each of the at least one protruding portion having a cavity therein for receiving one of the one or more ferrules to cover the one or more ferrules when the cover is mounted to the connector.

The dust cover of the present invention is especially designed for use with optical fiber connectors having a plurality of fiber optic ferrules for terminating a plurality of optical fibers and, in such applications, the dust cover includes a plurality of protruding portions extending from the base portion for individually covering each of the plurality of ferrules.

With the dust cover of the present invention, each of a plurality of fiber optic ferrules of an optical fiber connector can be separately covered (or uncovered) simultaneously in a single operation, thereby both simplifying and speeding up the operation. The dust cover is designed such that each ferrule is fully and individually covered when the dust cover is mounted to the connector so as to reliably protect the ferrules and the optical fibers carried thereby from dust or other contaminants when the connector is not in use.

In accordance with a presently preferred embodiment, the dust cover also includes a grasping portion which extends from the base portion in a direction opposite to that of the protruding portions to assist the user in grasping and manipulating the cover during mounting and removal operations. The grasping portion preferably comprises a relatively flat portion that can be easily and firmly grasped by the user to push the dust cover toward or to pull the cover away from the connector.

The dust cover of the invention preferably also includes a lanyard for attaching the cover to the connector or to an optical fiber cable to which the connector is attached so as to prevent misplacement of the cover when it is not in use.

The dust cover of the present invention is especially suitable for use with connectors of the type which include a retractable body portion which normally surrounds the ferrules when the connector is not in use in that the ferrules of such connectors can be simultaneously covered without it being necessary to move the retractable body portion to a retracted position.

The dust cover of the present invention can be provided with any desired number of protruding portions, depending upon the number of ferrules in the particular connector with which it is to be used, and can be readily adapted for use with numerous connector types and configurations.

Further advantages and specific details of the invention will become more apparent hereafter in conjunction with the following detailed description of a presently preferred embodiment.

BRIEF DESCRIPTION OF THE DRAWINGS

FIG. 1 is a perspective view of an optical fiber connector and a dust cover therefor according to a presently preferred embodiment of the invention;

FIG. 2 is a perspective front view of the dust cover of FIG. 1;

FIG. 3 is a perspective view of the connector and dust cover of FIG. 1 showing the dust cover mounted to the connector;

DETAILED DESCRIPTION OF THE PREFERRED EMBODIMENT

Figure 4:
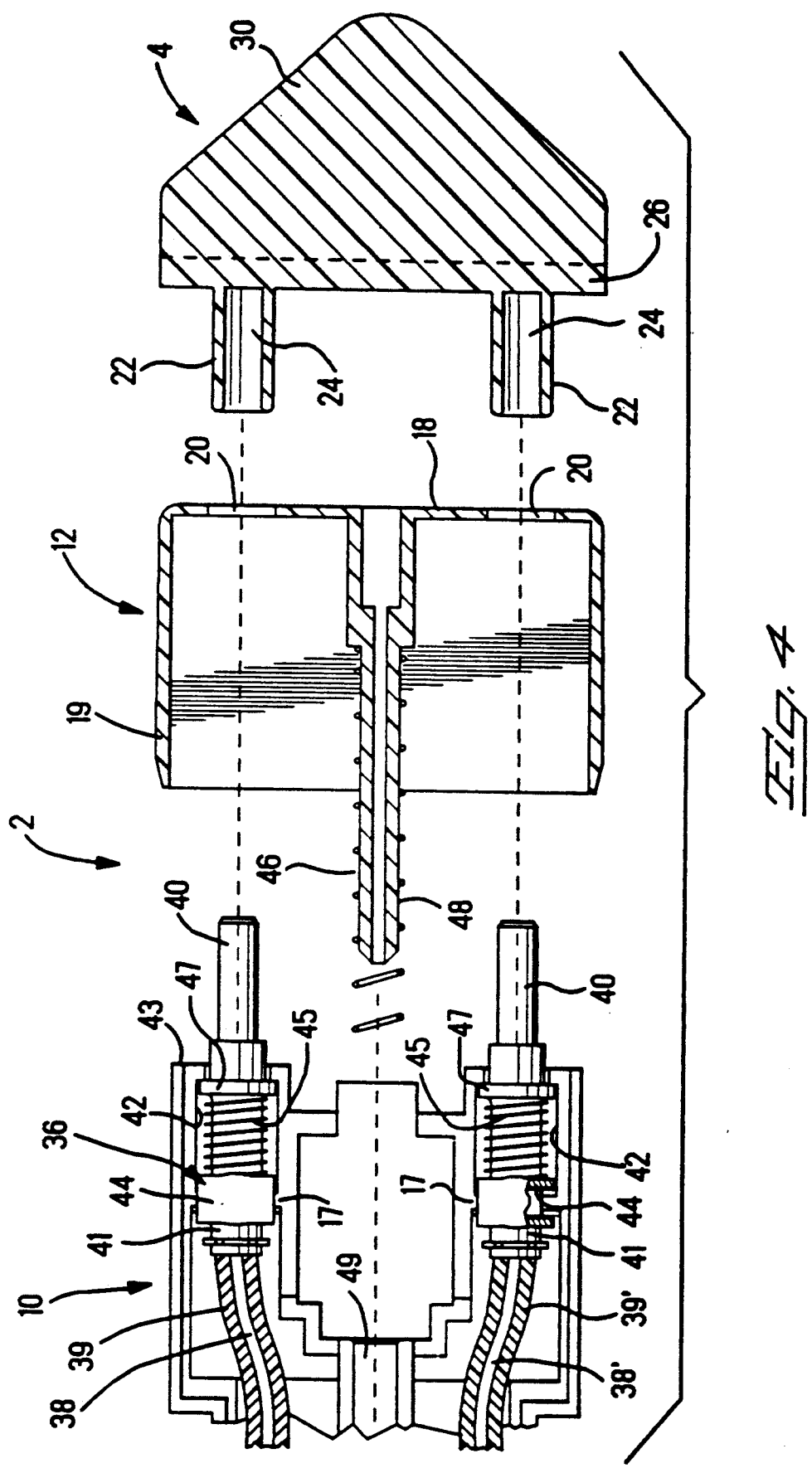
FIG. 4 is a exploded cross-sectional view illustrating details of the connector and dust cover of FIG. 1.

FIGS. 1-7 show an optical fiber connector and a dust cover therefor according to a presently preferred embodiment of the invention. The connector is generally designated by reference number 2 and includes a rear, main body portion 10 and a front, retractable body portion 12. Rear, main body portion 10 is adapted to be attached to the end of an optical fiber cable 6 which is preferably provided with a strain relief 8 as illustrated in FIGS. 1 and 3.

As best shown in FIG. 4, optical fiber cable 6 is of the type which carries a plurality of optical fibers; and, in the presently described embodiment, carries two optical fibers 38, 38'. As known to those skilled in the art, to assemble connector 2 to the end of cable 6, a portion of the cable jacket is first removed to expose end portions of the optical fibers 38, 38', which are covered by buffer layers 39, 39', respectively; and the exposed end portions of the fibers are extended into the main body portion 10 of the connector and the ends thereof are terminated by fiber termination structures 36 which include fiber optic ferrules 40 of ceramic or other material.

More particularly, and as illustrated in FIGS. 4-7, fiber termination structures 36 also each include a tubular-shaped support member 41 positioned within a passageway 42 in main connector body portion 10; and a ferrule 40 is mounted to the outer end of each tubular-shaped support member so as to extend outwardly beyond the front end 43 of body portion 10. A spring 45 is positioned around each tubular-shaped member and extends between a U-shaped clip or positioning element 44 and an annular flange 47 on the tubular-shaped member. Clip 44 is dimensioned to be held by interference fit on internal wall portions 17, as illustrated in FIG. 4 where a part of clip 44 has been broken away to reveal wall portion 17.

As should be apparent from the figures, springs 45 normally bias the fiber termination structures 36 including the ferrules 40 to the right in FIGS. 4-7 such that the ferrules 40 are substantially fully extended out of body portion 10; however, permit the ferrules to retract inwardly slightly when pushed. This resilient mounting of the ferrules 40 helps to ensure proper mating of the ferrules 40 and the ends of the optical fibers carried thereby with the ferrules to and optical fibers of a mating connector.

Main body portion 10 also includes two latching arms 14 having latching lugs 16 formed thereon for use in attaching the connector to a mating connector or the like.

Figure 5:
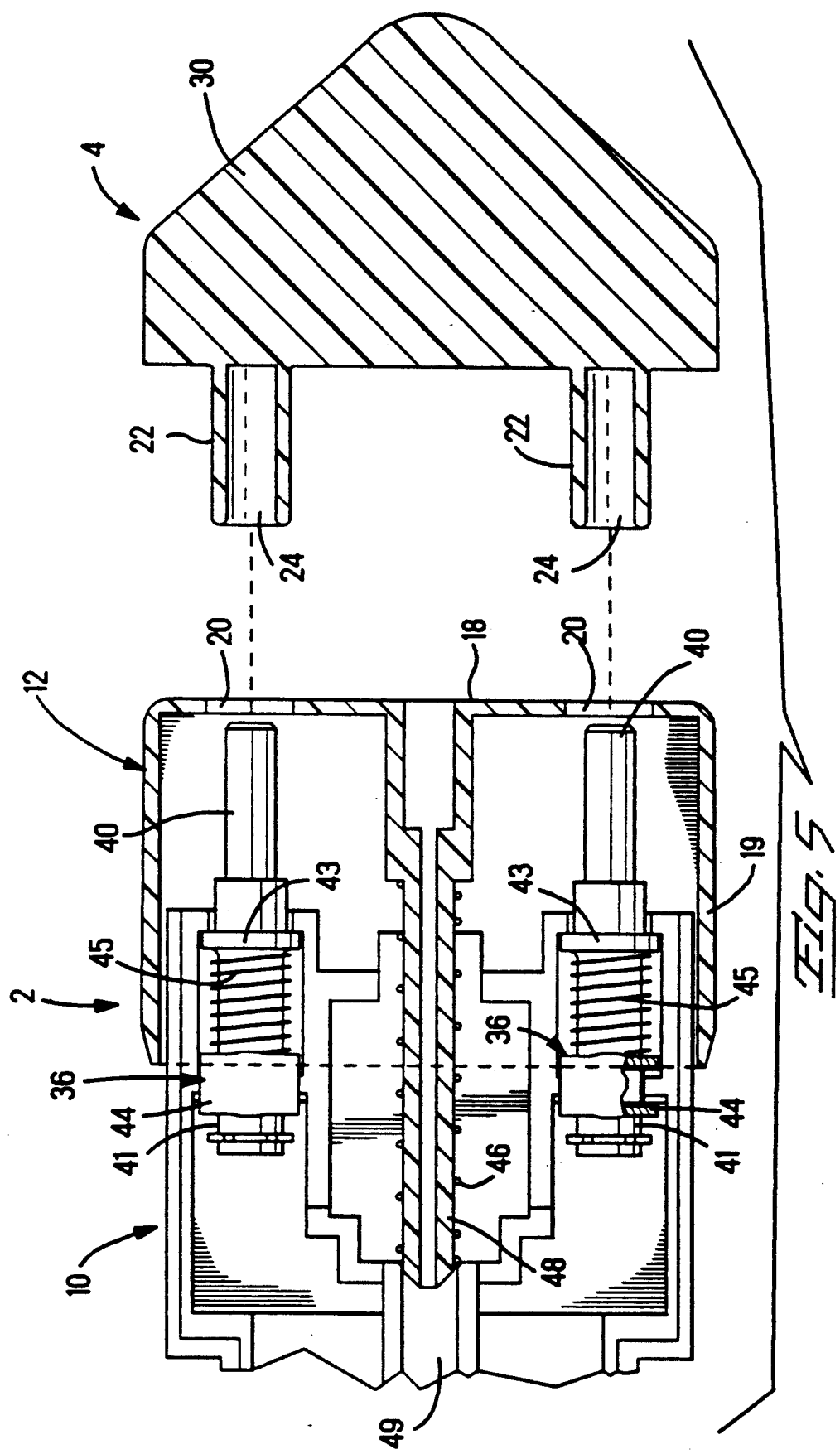
FIG. 5 is a cross-sectional view similar to FIG. 4, but with the connector in assembled form.
Figure 6:
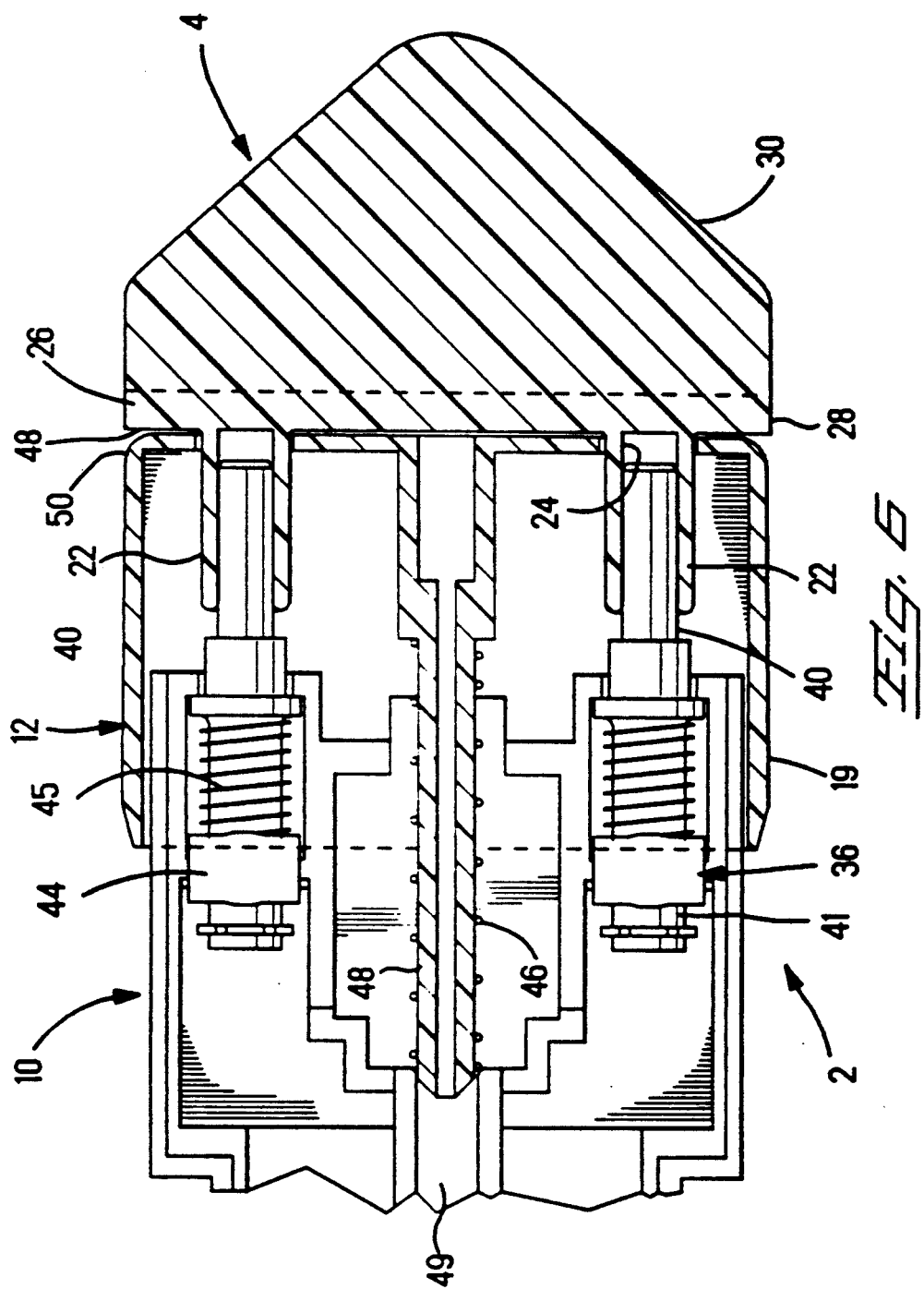
FIG. 6 is a cross-sectional view similar to FIG. 4 and 5, but with the dust cover mounted to the connector.

Retractable body portion 12 of connector 2 includes a generally rectangular-shaped front surface portion 18 and a skirt portion 19. Front surface portion 18 includes a pair of circular openings 20 positioned to be aligned with the ferrules 40 and which are of sufficient size to permit the ferrules to extend therethrough. Retractable portion 12 also includes a rearwardly extending post 48 which is positioned to extend into an opening 49 in main body portion 10. A spring 46 is positioned around post 48 and extends between rear body portion 10 and an annular flange formed on post 48 so as to normally bias the retractable body portion 12 to an extended position with respect to rear body portion 10 as shown in FIGS. 5 and 6.

When retractable body portion 12 is in its extended position, the ferrules 40 are substantially surrounded by skirt portion 19 thereof and do not protrude through the openings 20 in surface 18, thereby providing protection for the ferrules 40 and the optical fibers carried thereby when the connector is not mated.

Figure 7:
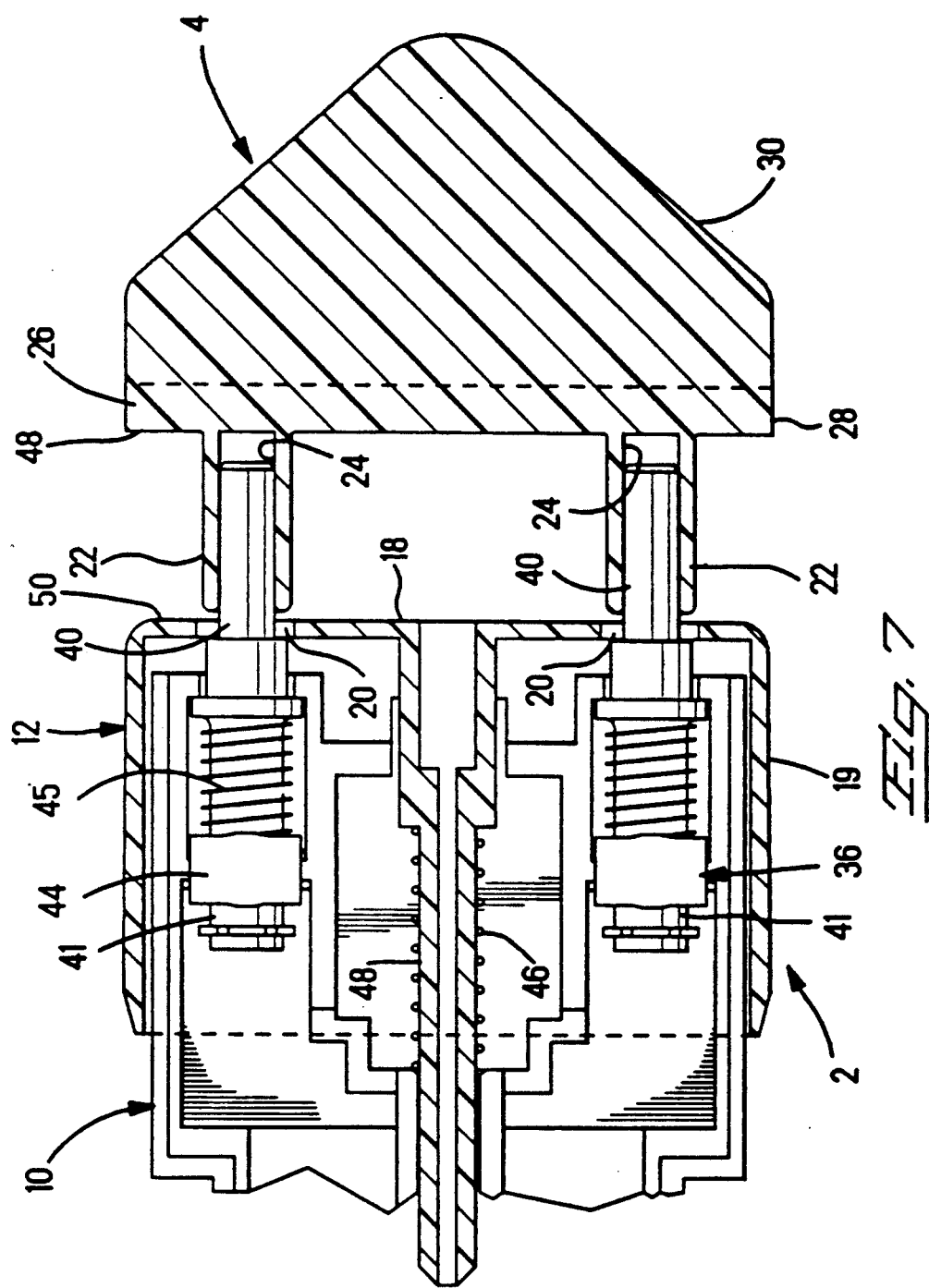
FIG. 7 is a cross-sectional view similar to FIG. 6, but with a retractable body portion of the connector in a retracted position.

By pushing retractable body portion 12 rearwardly against the bias of the spring 46, however, the body portion 12 can be moved to a retracted position illustrated in FIG. 7, at which the ferrules 40 extend through the openings 20 in front surface portion 18 and are exposed for proper mating.

FIG. 1 also illustrates a dust cover 4 according to a presently preferred embodiment of the invention for covering fiber optic ferrules 40 of connector 2 so as to protect the ferrules 40 and the optical fibers carried therein from dust or other debris when the connector 2 is not in use. Dust cover 4 comprises a generally rectangular-shaped base portion 26 having a size and shape to substantially cover the front surface portion 18 of retractable body portion 12 of connector 2 when the dust cover 4 is mounted to the connector 10. A pair of spaced protruding portions 22 (see also FIG. 2) extend outwardly from and are substantially perpendicular to the front surface 51 of base portion 26 and are positioned to be aligned with ferrules 40 in connector 2 when the dust cover 4 is mounted to the connector 10. Each protruding portion 22 is of tubular shape and includes a central axial cavity 24 extending substantially the length thereof for receiving an optical ferrule therein when the cover is mounted to the connector.

Dust cover 4 also includes a grasping portion 30 extending substantially perpendicular from the rear surface 52 of the base portion 26 to facilitate grasping and manipulating of the dust cover during mounting and removal of the dust cover from connector 2. Grasping portion 30 comprises a flat, generally triangular-shaped portion, the opposite surfaces of which can easily and firmly be grasped by a user.

Dust cover 4 is also provided with a lanyard 32 which extends from an edge of base portion 26. As shown in FIG. 3, a loop 34 formed at the free end of the lanyard 32 is adapted to encircle the cable 6 adjacent the strain relief 8 to loosely secure the dust cover 4 thereto to prevent misplacement of the cover when it is not in use.

Protruding portions 22 of dust cover 4 are sized to extend through openings 20 in front surface portion 18 of retractable body portion 12, and the central cavities 24 thereof are sized to receive and surround the ferrules 40 therein with a slight interference fit when the dust cover is mounted to the connector.

To mount dust cover 4 to connector 2, the grasping portion 30 of the dust cover is grasped by the user, and the protruding portions 22 of the dust cover are aligned with ferrules 40 of the connector. The dust cover is then pushed toward the connector thereby causing the protruding portions 22 to simultaneously enter into openings 20 in retractable portion 12 and to simultaneously surround and cover the ferrules 40.

FIG. 6 shows dust cover 4 mounted on connector 2. As shown in the Fig., the length of protruding portions 22 is such that ferrules 40 will extend substantially fully into the cavities 24 thereof and be substantially fully covered so as to prevent the accumulation of dust or other debris thereon. In addition, when mounted, front surface 51 of base portion 26 of dust cover 4 engages outer surface 18 of retractable body portion 12 to thereby effectively cover openings 20 and provide further protection against contaminants entering into the connector through the openings 20.

FIG. 7 shows the connector assembly 2 with retractable body portion 12 in its retracted position. As shown, dust cover 4 still substantially fully covers and protects the ferrules when the retractable body portion is in this position.

From FIGS. 6 and 7, it should be readily apparent that dust cover 4 permits both ferrules 40 to be quickly and easily covered or uncovered simultaneously in a single operation. Also, the dust cover can be mounted to and removed from the connector without it being necessary to retract the retractable body portion 12 of the connector, thus further facilitating the procedure.

Preferably, dust cover 4 comprises a unitary, one-piece structure formed of a suitable resilient material, such as Santopren ® thermoplastic rubber available from Monsanto Chemical Co., Akron, Ohio. The thickness of the protruding portions 22 is such that the portions are relatively flexible so as to effectively receive the ferrules with an interference fit. The base portion 26 and the grasping portion 30, are preferably somewhat thicker so as to be more rigid and less deformable for most effective operation of the cover.

Although the present invention has been described with reference to presently preferred embodiments, those skilled in the art will recognize that numerous changes may be made in form and detail without departing from the spirit and scope of the invention. For example, although the above-described dust cover is designed for use with a connector having two fiber optic ferrules, the cover could readily be adapted for use with connectors having one or any plurality of ferrules. Also, although the dust cover is especially advantageous with connectors having retractable body portions, the cover can be used with numerous connector types and designs. Because the invention can take numerous forms, it should be understood that the invention is to be limited only insofar as is required by the scope of the following claims.

We claim:

1. A dust cover for covering one or more fiber optic ferrules of an optical fiber connector, comprising:
    a base portion; and
    at least one protruding portion extending from said base portion, each of said at least one protruding portion having a cavity therein adapted for individually receiving one ferrule of said one or more ferrules to individually cover the one ferrule that corresponds to the cavity when said dust cover is mounted to said connector.

2. The dust cover of claim 1, and further including a grasping portion extending from said base portion in a direction opposite to that of said at least one protruding portion to facilitate grasping and manipulating of said dust cover.

3. The dust cover of claim 2 wherein said grasping portion comprises a substantially flat portion extending substantially perpendicular from a surface of said base portion.

4. The dust cover of claim 1 wherein said base portion substantially covers a front surface of said connector when said one or more ferrules is received in the cavity of each of said at least one protruding portion.

5. The dust cover of claim 1 wherein said one or more ferrules comprises a plurality of spaced ferrules, and wherein said at least one protruding portion comprises a plurality of spaced protruding portions for receiving and covering each of said plurality of spaced ferrules.

6. The dust cover of claim 5 wherein the cavity of each of said plurality of protruding portions is sized to receive a ferrule with an interference fit.

7. The dust cover of claim 5 wherein said plurality of protruding portions comprises a plurality of flexible, tubular-shaped protruding portions.

8. The dust cover of claim 1 and further comprising a lanyard having a loop at a free end thereof for securing said dust cover to an optical fiber cable to which said connector is attached.

9. A dust cover for covering a plurality of ferrules of an optical fiber connector, comprising:
    a base portion; and
    a plurality of protruding portions extending from a front surface of said base portion, each of said plurality of protruding portions having a cavity therein for individually receiving one ferrule of said plurality of ferrules to individually cover the one ferrule that corresponds to the cavity when the dust cover is mounted to said connector.

10. The dust cover of claim 9, and further including a grasping portion extending from a rear surface of said base portion in a direction opposite to that of said plurality of protruding portions to facilitate grasping and manipulating of said dust cover.

11. The dust cover of claim 9 wherein said front surface of said base portion is sized and configured to substantially cover a front surface of said connector when said plurality of ferrules are received in the cavities of each of said plurality of protruding portions.

12. A connector assembly comprising:
    a connector having a main body portion and a retractable body portion, and a plurality of ferrules for terminating a plurality of optical fibers; and
    a dust cover for individually covering said plurality of ferrules, said dust cover including a base portion, and a plurality of protruding portions extending from a front surface of said base portion, each of said plurality of protruding portions having a cavity therein for individually receiving one ferrule of said plurality of ferrules to individually cover the one ferrule that corresponds to the cavity when said dust cover is mounted to said connector.

13. The connector assembly of claim 12 wherein said retractable body portion of said connector includes a front surface having plurality of openings therein aligned with said plurality of ferrules, and wherein said plurality of protruding portions are adapted to extend through said plurality of openings to cover said plurality of ferrules when said retractable body portion is in an extended position substantially surrounding said plurality of ferrules.

14. The connector assembly of claim 13 wherein said front surface of said base portion of said dust cover engages said front surface of said retractable body portion of said connector when said dust cover is mounted to said connector and said retractable body portion is in said extended position.

15. The connector assembly of claim 12 and further including a grasping portion extending from a rear surface of said base portion of said dust cover to facilitate grasping and manipulating of said dust cover.

16. The connector assembly of claim 16 wherein said grasping portion comprises a substantially flat portion extending substantially perpendicular from said rear surface.

17. The connector assembly of claim 12 and further including a lanyard on said dust cover and having a loop at a free end thereof for encircling a fiber optic cable to which said connector is attached.

* * * * *